US012221967B2

(12) United States Patent
Drake

(10) Patent No.: US 12,221,967 B2
(45) Date of Patent: Feb. 11, 2025

(54) CENTRIFUGAL COMPRESSOR WITH REVERSE OVERHUNG VOLUTE

(71) Applicant: DAIKIN INDUSTRIES, LTD., Osaka (JP)

(72) Inventor: Midori Drake, Minneapolis, MN (US)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/601,307

(22) Filed: Mar. 11, 2024

(65) Prior Publication Data

US 2024/0209862 A1 Jun. 27, 2024

Related U.S. Application Data

(62) Division of application No. 17/517,789, filed on Nov. 3, 2021, now Pat. No. 11,953,015.

(51) Int. Cl.
*F04D 17/10* (2006.01)
*F04D 25/02* (2006.01)
(Continued)

(52) U.S. Cl.
CPC ............ *F04D 17/10* (2013.01); *F04D 25/02* (2013.01); *F04D 29/063* (2013.01);
(Continued)

(58) Field of Classification Search
CPC ........ F04D 17/10; F04D 25/02; F04D 29/063; F04D 29/284; F04D 29/4233; F25B 31/066
See application file for complete search history.

(56) References Cited

U.S. PATENT DOCUMENTS 6,065,297 A * 5/2000 Tischer .................. F04D 25/06 62/505
6,176,092 B1 1/2001 Butterworth et al.
(Continued)

FOREIGN PATENT DOCUMENTS

| | | | |
|---|---|---|---|
| CA | 2 610 421 | A1 | 4/2000 |
| CN | 103277324 | A | 9/2013 |
| WO | 2021030319 | A1 | 2/2021 |

OTHER PUBLICATIONS

International Search Report and Written Opinion for the corresponding international application No. PCT/JP2022/038546, issued on Jan. 17, 2023.

*Primary Examiner* — Sabbir Hasan
(74) *Attorney, Agent, or Firm* — Global IP Counselors, LLP

(57) ABSTRACT

A centrifugal compressor for a chiller includes an inlet guide vane; an impeller, a diffuser, a volute forming member, a compressor housing, and an insert. The volute forming member is disposed downstream of the diffuser. The volute forming member forms a volute to receive a refrigerant after the refrigerant has been compressed. The volute has a reverse overhung configuration. The compressor housing encloses the impeller. The insert is disposed around an outer periphery of the impeller and interposed between the volute forming member and the compressor housing. The insert includes a diffuser defining wall surface that opposes an inner surface of the volute forming member. The diffuser is defined between the volute forming member and the diffuser defining wall surface.

8 Claims, 7 Drawing Sheets

(51) Int. Cl.

| | |
|---|---|
| ***F04D 29/063*** | (2006.01) |
| ***F04D 29/28*** | (2006.01) |
| ***F04D 29/42*** | (2006.01) |
| ***F04D 29/44*** | (2006.01) |
| ***F04D 29/58*** | (2006.01) |
| ***F04D 29/66*** | (2006.01) |
| ***F25B 31/02*** | (2006.01) |

(52) U.S. Cl.

CPC ....... *F04D 29/284* (2013.01); *F04D 29/4233* (2013.01); *F04D 29/444* (2013.01); *F04D 29/5846* (2013.01); *F04D 29/664* (2013.01); *F04D 29/665* (2013.01); *F04D 29/667* (2013.01); *F25B 31/026* (2013.01); *F05B 2250/502* (2013.01); *F05B 2260/96* (2013.01); *F05D 2250/52* (2013.01); *F05D 2260/4031* (2013.01)

(56) References Cited

U.S. PATENT DOCUMENTS

2012/0186247 A1 7/2012 Marques et al.
2016/0123342 A1 5/2016 Harrison et al.
2022/0333602 A1* 10/2022 Iancu .................... F04D 29/684

* cited by examiner

CENTRIFUGAL COMPRESSOR WITH REVERSE OVERHUNG VOLUTE

CROSS-REFERENCE TO RELATED APPLICATIONS

This application is a divisional application of U.S. patent application Ser. No. 17/517,789 filed on Nov. 3, 2021. The entire disclosure of U.S. patent application Ser. No. 17/517,789 is hereby incorporated herein by reference.

BACKGROUND

Field of the Invention

The present invention generally relates to a centrifugal compressor adapted for use in a chiller system. More specifically, the present invention relates to a centrifugal compressor with a volute having a reverse overhung configuration.

Background Information

A chiller system is a refrigerating machine or apparatus that removes heat from a medium. Commonly, a liquid, such as water, is used as the medium and the chiller system operates in a vapor-compression refrigeration cycle. This liquid can then be circulated through a heat exchanger to cool air or equipment as required. As a necessary byproduct, refrigeration creates waste heat that must be exhausted to the ambient surroundings or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing (housing), an inlet guide vane, an impeller, a diffuser, a volute, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity (kinetic energy) of refrigerant gas. The diffuser works to transform the velocity of refrigerant gas (dynamic pressure) discharged from the impeller into (static) pressure. The volute receives the refrigerant exiting the diffuser and guides the refrigerant to a discharge pipe connected to the centrifugal compressor while allowing the velocity of the refrigerant to be maintained. The motor rotates the impeller. The controller controls the motor, the inlet guide vane and the expansion valve. In this manner, the refrigerant is compressed in a conventional centrifugal compressor. The inlet guide vane is typically adjustable and the motor speed is typically adjustable to adjust the capacity of the system. In addition, the diffuser may be adjustable to further adjust the capacity of the system. In addition to controlling the motor, the inlet guide vane and the expansion valve, the controller can further control any additional controllable elements, such as the diffuser.

Some centrifugal compressors for chillers have multiple compression stages to achieve a higher degree of compression. Some multistage centrifugal compressors have an in-line configuration in which the impellers are disposed adjacently along the axial direction of the centrifugal compressor and the motor is disposed on one side of the compressor housing (e.g., the discharge side). There are also two-stage centrifugal compressors in which the motor is disposed between the two stages of the centrifugal compressors.

In a conventional in-line centrifugal compressor for a chiller, an output shaft of the motor is typically, connected to the impellers through a gear mechanism and a secondary shaft that is connected to the impellers. A motor housing of the motor is typically disposed on a discharge side of the compressor housing and the gear mechanism is disposed between the motor housing and the compressor housing. The secondary shaft is typically offset from the output shaft of the motor in a radial direction of the output shaft and arranged to extend in a direction parallel to an axial direction of the output shaft of the motor (see FIG. 8). The volute is typically biased away from the motor and the gear mechanism (toward the first stage side of the centrifugal compressor) and disposed outboard of or surrounding the second stage impeller.

SUMMARY

There is a need to shorten the axial length of in-line centrifugal compressors adapted for use in chiller systems. A smaller footprint provides the advantage of enabling the centrifugal compressor to be installed in a wider variety of locations. This is particularly true in the case of multistage centrifugal compressors and multistage centrifugal compressors having an injection nozzle for introducing refrigerant from an economizer or other portion of the refrigeration circuit to an intermediate stage of the multistage centrifugal compressor. The additional stages, the injection nozzle, and an injection space into which refrigerant is introduced from the injection nozzle each contribute to the axial length of the centrifugal compressor. Conventionally, as mentioned above, a centrifugal compressor used in a chiller has a forward overhung volute on the discharge side (second stage side in a two-stage centrifugal compressor). That is, in a conventional centrifugal compressor, the volute is biased or offset toward the impeller with respect to the diffuser and competes with other components for space in the area surrounding the outer periphery of the impeller (second-stage impeller in a two-stage centrifugal compressor).

An object of the present invention is to reduce the axial length of a centrifugal compressor for a chiller, particularly an in-line multistage centrifugal compressor.

In view of the state of the known technology, one aspect of the present disclosure is to provide a centrifugal compressor for a chiller. The centrifugal compressor includes an inlet guide vane, an impeller, a diffuser, a volute forming member, a compressor housing, and an insert. The volute forming member is disposed downstream of the diffuser. The volute forming member forms a volute to receive a refrigerant after the refrigerant has been compressed. The volute has a reverse overhung configuration. The compressor housing encloses the impeller. The insert is disposed around an outer periphery of the impeller and interposed between the volute forming member and the compressor housing. The insert includes a diffuser defining wall surface that opposes an inner surface of the volute forming member. The diffuser is defined between the volute forming member and the diffuser defining wall surface.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
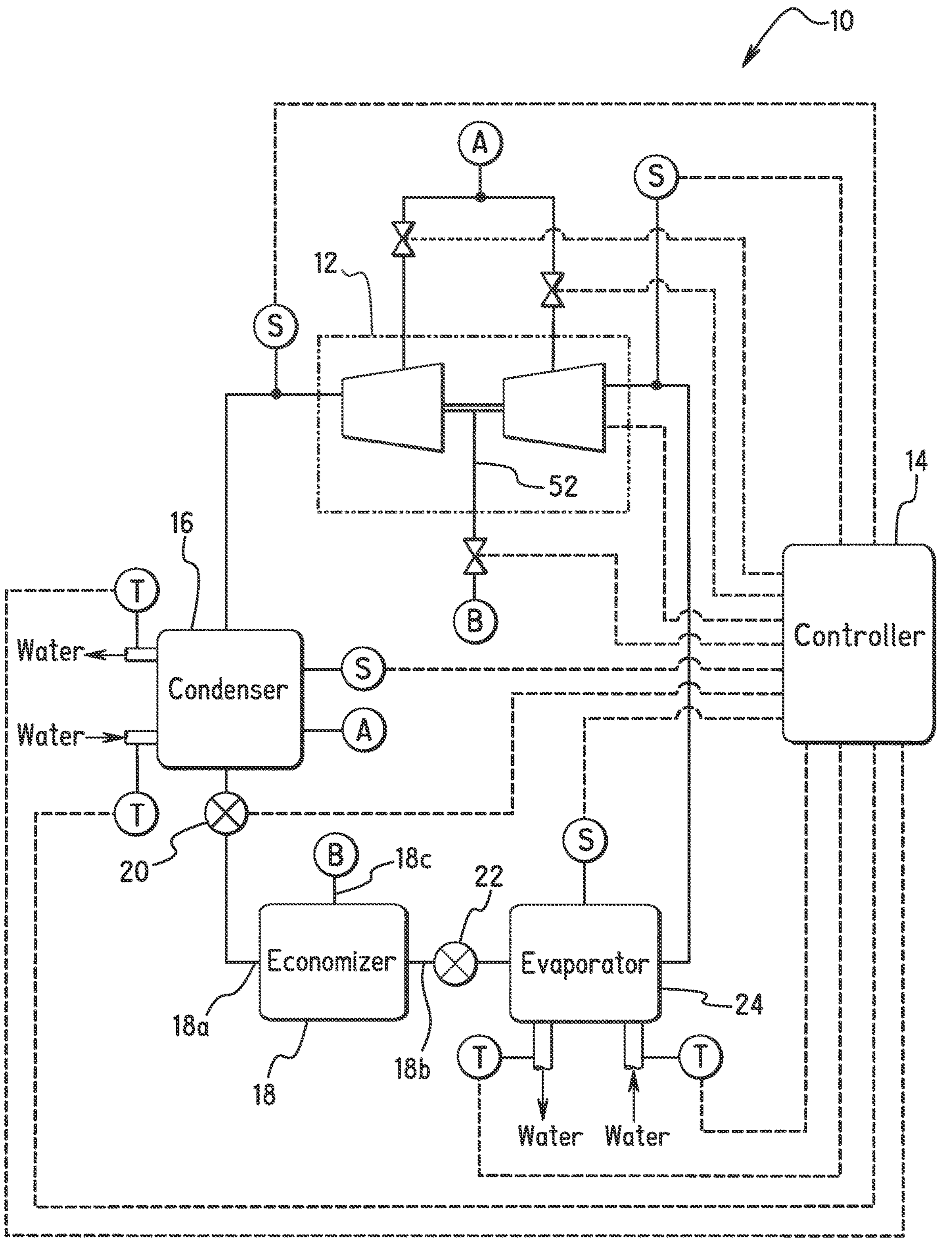
FIG. 1 illustrates a chiller system including a circumferential compressor according to an embodiment of the present invention.
Figure 2:
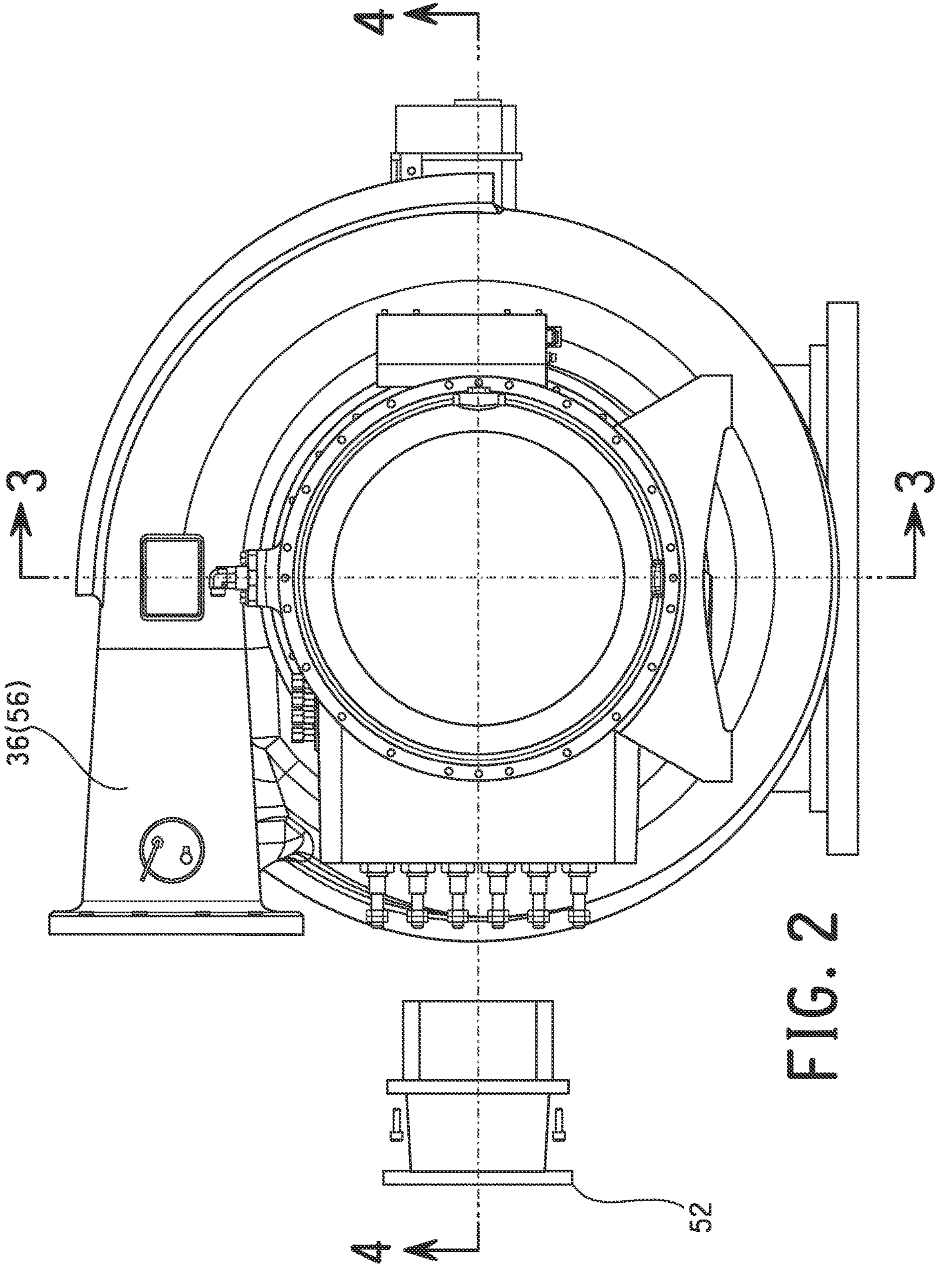
FIG. 2 is a side view of a discharge side of the centrifugal compressor as viewed along an axial direction of the centrifugal compressor.

Referring initially to FIG. 1, illustrated is a chiller system 10 that includes at least a centrifugal compressor 12 in accordance with an exemplary embodiment of the present invention. The chiller system 10 is preferably a water chiller that utilizes cooling water and chiller water in a conventional manner. The chiller system 10 illustrated herein is a two-stage chiller system. However, it will be apparent to those skilled in the art from this disclosure that the chiller system 10 could be a single stage chiller system or a multiple stage chiller system including three or more stages.

The chiller system 10 basically includes the centrifugal compressor 12, a chiller controller 14, a condenser 16, an economizer 18, expansion valves 20 and 22, and an evaporator 24 connected together in series to form a loop refrigeration cycle. In addition, various sensors S and T may be disposed throughout the circuit of the chiller system 10. The chiller system 10 may include orifices instead of the expansion valves 20 and 22.

Figure 3:
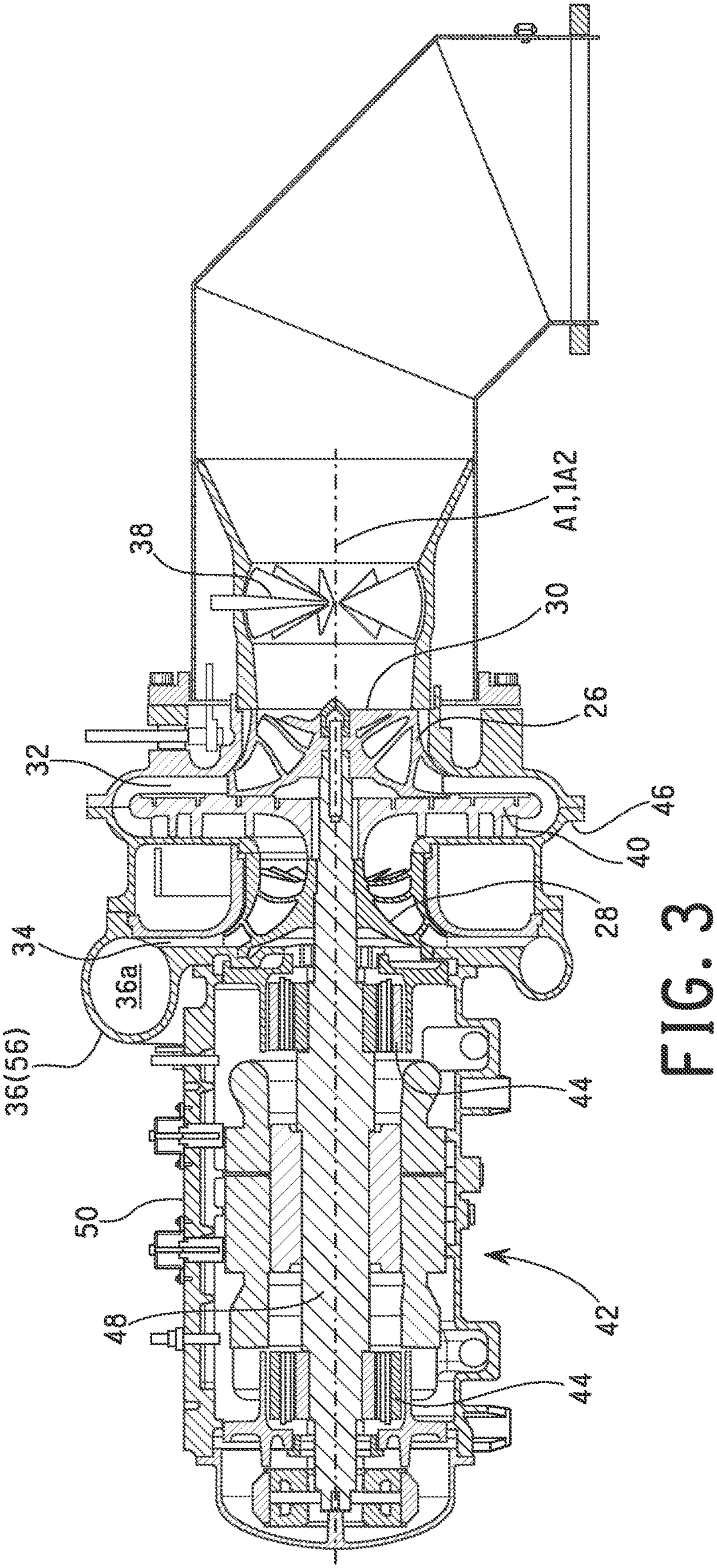
FIG. 3 is a longitudinal cross-sectional view of the centrifugal compressor as viewed according to the section line shown in FIG. 2.

Referring to FIGS. 1 and 3, the centrifugal compressor 12 is a two-stage in-line centrifugal compressor in the illustrated embodiment. The centrifugal compressor 12 illustrated herein is a two-stage centrifugal compressor that includes two impellers. However, the centrifugal compressor 12 can be a single stage centrifugal compressor or a multiple stage centrifugal compressor including three or more impellers. The two-stage in-line centrifugal compressor 12 of the illustrated embodiment includes a first stage impeller 26 and a second stage impeller 28. The first stage impeller 26 is arranged to receive refrigerant from an inlet 30. The centrifugal compressor 12 also includes a first stage diffuser 32 and a second stage diffuser 34. The first stage diffuser 32 is disposed on a downstream side of the first stage impeller 26 and an upstream side of the second stage impeller 28. The second stage diffuser 34 is disposed on a downstream side of the second stage impeller 28. A second stage volute 36 is disposed downstream of the second stage diffuser 34 to receive the refrigerant after the refrigerant has been compressed. The second stage volute 36 has a reverse overhung configuration. The centrifugal compressor 12 further includes a first stage inlet guide vane 38, a second stage inlet guide vane 40, a compressor motor 42, and various sensors (only some shown). In some embodiments, the compressor motor 42 May include a magnetic bearing assembly 44. The magnetic bearing assembly 44 magnetically supports an output shaft 48 of the compressor motor 42. Alternatively, the bearing system may include a roller element, a hydrodynamic bearing, a hydrostatic bearing, an oil bearing, and/or a magnetic bearing, or any combination of these. The structure of the centrifugal compressor 12 will be discussed in more detail later. The compressor motor 42 includes a motor housing 50.

The chiller controller 14 receives signals from the various sensors and controls the inlet guide vanes 38 and 40, the compressor motor 42, and the magnetic bearing assembly 44, as explained in more detail below. Refrigerant flows in order through the first stage inlet guide vane 38, the first stage impeller 26, the first stage diffuser 32, the second stage inlet guide vane 40, the second stage impeller 28, the second stage diffuser 34, and the second stage volute 36. The inlet guide vanes 38 and 40 control the flow rate of refrigerant gas into the impellers 26 and 28, respectively. The impellers 26 and 28 increase the velocity of refrigerant gas, generally without changing pressure. The speed of the compressor motor 42 determines the amount of increase of the velocity of refrigerant gas. The first and second stage diffusers 32 and 34 increase the refrigerant pressure. The first and second stage diffusers 32 and 34 are non-movably fixed relative to a compressor housing 46. The compressor motor 42 rotates the impellers 26 and 28 via a shaft, e.g., the output shaft 48 of the compressor motor 42 or a second shaft coupled to the output shaft 48. In this manner, the refrigerant is compressed in the centrifugal compressor 12.

More specifically, in operation of the chiller system 10, the first stage impeller 26 and the second stage impeller 28 of the centrifugal compressor 12 are rotated by the compressor motor 42, and the refrigerant of low pressure in the chiller system 10 is drawn through the inlet 30 by the first stage impeller 26. The flow rate of the refrigerant is adjusted by the first stage inlet guide vane 38. The refrigerant drawn by the first stage impeller 26 is compressed to intermediate pressure, the refrigerant pressure is increased by the first stage diffuser 32, and the refrigerant is then introduced to the second stage impeller 28. The flow rate of the refrigerant is adjusted by the second stage inlet guide vane 40. The second stage impeller 28 accelerates and compresses the refrigerant, and the refrigerant pressure is increased from an intermediate pressure to a high pressure by the second stage diffuser 34. The high-pressure gas refrigerant is then discharged through the second stage volute 36 to the chiller system 10.

Referring to FIG. 1, in the chiller system 10, the economizer 18 is disposed between the condenser 16 and the evaporator 24. The economizer 18 includes an inlet port 18*a*, a liquid outlet port 18*b*, and a gas outlet port 18*c*. The inlet port 18*a* is provided to introduce the two-phase refrigerant from the condenser 16 into the economizer 18. The liquid outlet port 18*b* is provided to discharge liquid refrigerant separated from the two-phase refrigerant to the evaporator 24. The gas outlet port 18*c* is provided to discharge the gas refrigerant separated from the two-phase refrigerant to an intermediate stage of the centrifugal compressor 12. The gas outlet port 18*c* is connected to an injection nozzle 52 of the centrifugal compressor 12. The flow rate of the refrigerant flowing into the inlet port 18*a* is controlled by the expansion valve 20 which is disposed between the condenser 16 and the economizer 18.

In operation, the refrigerant cooled to condense in the condenser 16 is decompressed to an intermediate pressure by the expansion valve 20 and then introduced into the economizer 18. The two-phase refrigerant introduced from the inlet port 18*a* into the economizer 18 is separated into gas refrigerant and liquid refrigerant by the economizer 18. Under some conditions, the gas refrigerant is injected from the gas outlet port 18*c* of the economizer 18 into injection nozzle 52 of the centrifugal compressor 12 via a pipe. Under some conditions, the liquid refrigerant is guided from the liquid outlet port 18*b* to the evaporator 24, or can be stored in a liquid storage portion of the economizer 18, or can be injected into the first stage diffuser 32 and/or the second stage diffuser 34 of the centrifugal compressor 12 via a pipe. Liquid refrigerant from the condenser 16 can also be injected into the first stage diffuser 32 and/or the second stage diffuser 34 of the centrifugal compressor 12 via a pipe.

The gas refrigerant injected into the injection nozzle 52 enters an injection space 54 of the centrifugal compressor 12 and is mixed with the refrigerant of intermediate pressure compressed by the first stage impeller 26 of the centrifugal compressor 12. The mixed refrigerant flows to the second stage impeller 28 to be further compressed.

The compressor housing 46 includes an inlet portion (inlet side) 46A and an outlet portion (discharge side) 46B. The inlet portion 46A includes the inlet 30 and houses the first stage impeller 26. The second stage portion 46B houses the second stage impeller 28 and mates with the second stage volute 36 (described in more detail later). The first stage impeller 26 is rotatable about a first rotation axis A1, and the second stage impeller 28 is rotatable about a second rotation axis A2. In the illustrated embodiment, the first and second rotation axes A1 and A2 are collinear as shown in FIG. 3, but in some embodiments the rotation axes may be radially offset. The second stage diffuser 34 is disposed downstream from the second stage impeller 28 and upstream from the second stage volute 36.

With reference to FIGS. 2-6, the centrifugal compressor 12 according to the illustrated embodiment will now be discussed in more detail. The centrifugal compressor 12 is a multiple-stage in-line centrifugal compressor provided with a volute having a reverse overhung configuration. More specifically, the centrifugal compressor 12 according to this embodiment has two stages, a first stage and a second stage. In some embodiments, the centrifugal compressor 12 may have more than two stages. As mentioned above, the centrifugal compressor 12 includes the first stage impeller 26, the second stage impeller 28, the first stage diffuser 32, the second stage diffuser 34, and the second stage volute 36. The first stage diffuser 32 is disposed on a downstream side of the first stage impeller 26 and an upstream side of the second stage impeller 28. The second stage diffuser 34 is disposed on a downstream side of the second stage impeller 28. A second stage volute 36 is disposed downstream of the second stage diffuser 34 to receive the refrigerant after the refrigerant has been compressed. The second stage volute 36 has a reverse overhung configuration. That is, the second stage volute 36 bulges axially outward toward the compressor motor 42 instead of axially inward toward the inlet side of the compressor housing 46.

In some embodiments, the second stage volute 36 is configured and arranged such that the second stage diffuser 34 is disposed between the second stage impeller 28 and an axial-direction center C of the second stage volute 36. In other words, in a cross-sectional view including an axial center line of the centrifugal compressor (i.e., the rotational axes A1 and A2 in the illustrated embodiment), a geometric center (axial-direction center C, see FIG. 5) of the cross-sectional shape of the second stage volute 36 is on the opposite side of the second stage diffuser 34 as the second stage impeller 28 along the axial direction of the centrifugal compressor 12.

The compressor housing 46 encloses the first stage impeller 26 and the second stage impeller 28. The compressor motor 42 is arranged to drive the first stage impeller 26 and the second stage impeller 28. The compressor motor 42 disposed on the second-stage side of the compressor housing 46 such that the second stage impeller 28 is positioned between the compressor motor 42 and the first stage impeller 26 along the axial direction of the centrifugal compressor 12. Thus, the axial-direction center C of the second stage volute 36 is disposed toward the compressor motor 42 with respect to the second stage diffuser 34.

In some embodiments, the motor housing 50 of the compressor motor 42 is connected to the second-stage side of the compressor housing 46, and at least a portion of the second stage volute 36 overlaps the motor housing 50 when viewed along a direction perpendicular to the axial direction, i.e., perpendicular to the rotational axes A1 and A2. Also, in some embodiments, the first stage impeller 26 and the second stage impeller 26 are connected to the output shaft 48 of compressor motor 42 such that the output shaft 48 passes through the second stage impeller 28 and partially into the first stage impeller 26. The output shaft 48 is fixed to the first stage impeller 26 and the second stage impeller 28 such that the output shaft 48 can rotate both impellers simultaneously.

In some embodiments, the compressor housing 46 encloses the first stage impeller 26 and the second stage impeller 28 and the second stage volute 36 is attached to an exterior of the compressor housing 46 such that at least a portion of the second stage volute 36 overlaps the motor housing 50 when viewed along a direction perpendicular to an axial direction of the centrifugal compressor 12, i.e., perpendicular to the rotational axes A1 and A2.

Figure 4:
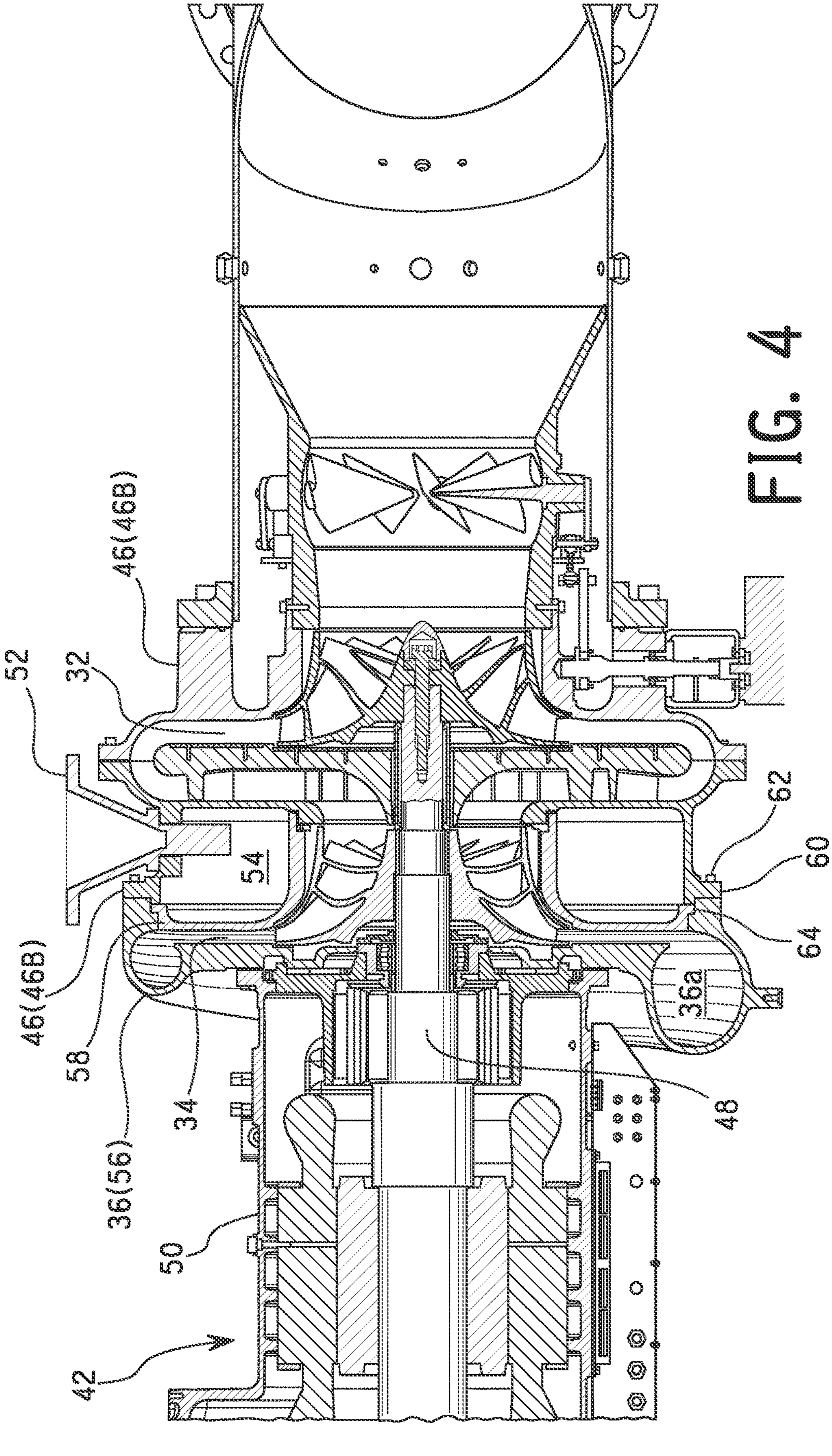
FIG. 4 is a longitudinal cross-sectional view of the centrifugal compressor in a section plane perpendicular to the section plane of FIG. 3.
Figure 5:
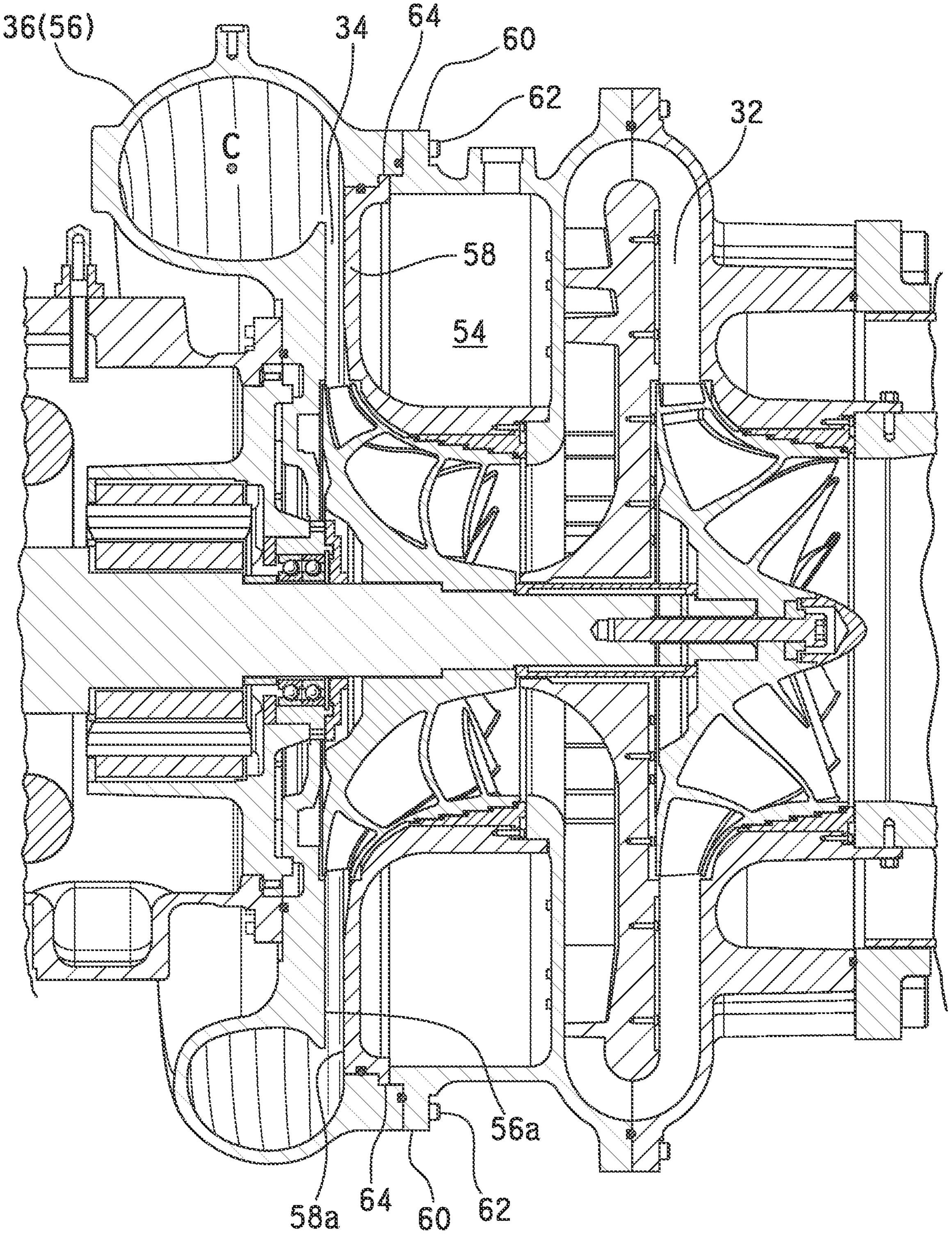
FIG. 5 is an enlarged partial cross-sectional view extracted from FIG. 3.
Figure 6:
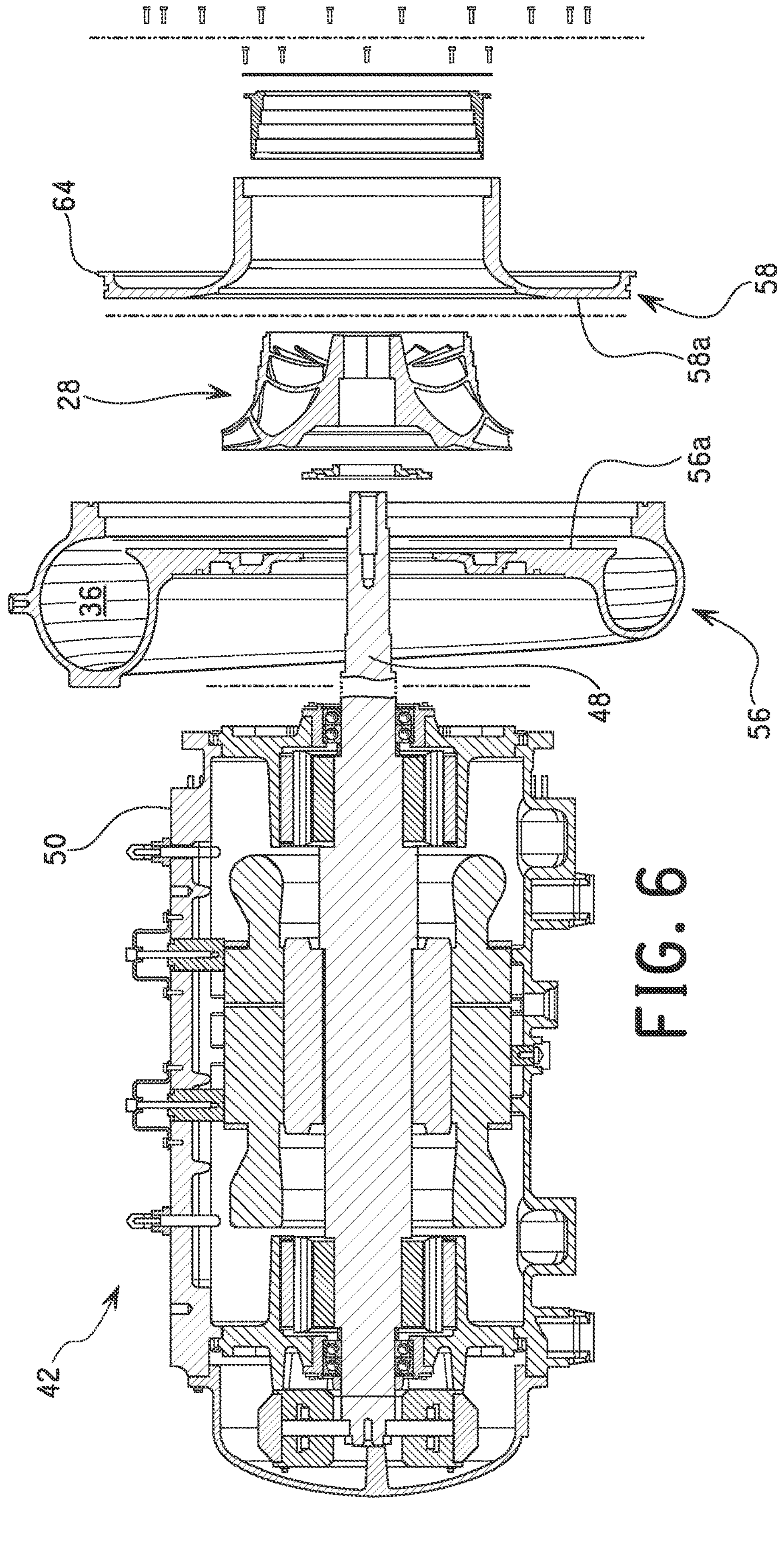
FIG. 6 is an exploded cross-sectional view showing the motor, the second-stage volute, the second stage impeller, and the insert.

Referring to FIGS. 4-6, in the illustrated embodiment, the centrifugal compressor 12 includes a volute forming member 56 (second stage volute forming member) that is separate from the compressor housing 46 and the motor housing 50 and defines the second stage volute 36, and the volute forming member 56 is interposed between the motor housing 50 and the outlet portion 46A on a second stage side (discharge side) of the compressor housing 46. The centrifugal compressor 12 includes an insert 58 disposed around an outer periphery of the second stage impeller 28 and interposed between the volute forming member 56 and the compressor housing 46. One side of the insert 58 includes a diffuser defining wall surface 58*a* that opposes an inner surface 56*a* of the volute forming member 56. The second stage diffuser 34 is defined between the volute forming member 56 and the one side of the insert 58, and the injection space 54 is defined between the opposite side of the insert 58 (i.e., the side opposite the diffuser defining wall surface 58*a* along the axial direction of the centrifugal compressor 12) and an interior wall of the compressor housing 46. At least a portion of an interior space 36*a* of the second stage volute 36 is disposed toward the compressor motor 42 with respect to the insert 58. In other words, the volute forming member 56 defines a reverse overhung configuration such that the second stage volute 36 bulges away from the compressor housing 46 and toward the motor housing 50 such that at least a portion of the interior space 36*a* overlaps the motor housing 50.

In the illustrated embodiment, the volute forming member 56 is configured to be mated against a flange 60 formed around an outer circumference of the compressor housing 46. The mating portion of the volute forming member 56 may have an internal circumferential surface that mates with an external circumferential surface of the compressor housing 46. The mating portion of the volute forming member 56 may also include an axially facing mating surface that mates against the flange of the compressor housing 46 in the axial direction of the centrifugal compressor 12. The volute forming member 56 may be secured to the flange 60 with fasteners 62. The insert 58 may be configured to be held in place by being clamped between the volute forming member 56 and the compressor housing 46. For example, the insert 58 may include an annular protrusion 64 configured to be clamped between the mating portion of the volute forming member 56 and the compressor housing 46 (e.g., the flange 60). Other attachment configurations can be used, but preferably the volute forming member 56 is a separate piece from the compressor housing 46 and the insert 58, and preferably the volute forming member 56 defines the entire interior space 36*a*.

Figure 8:
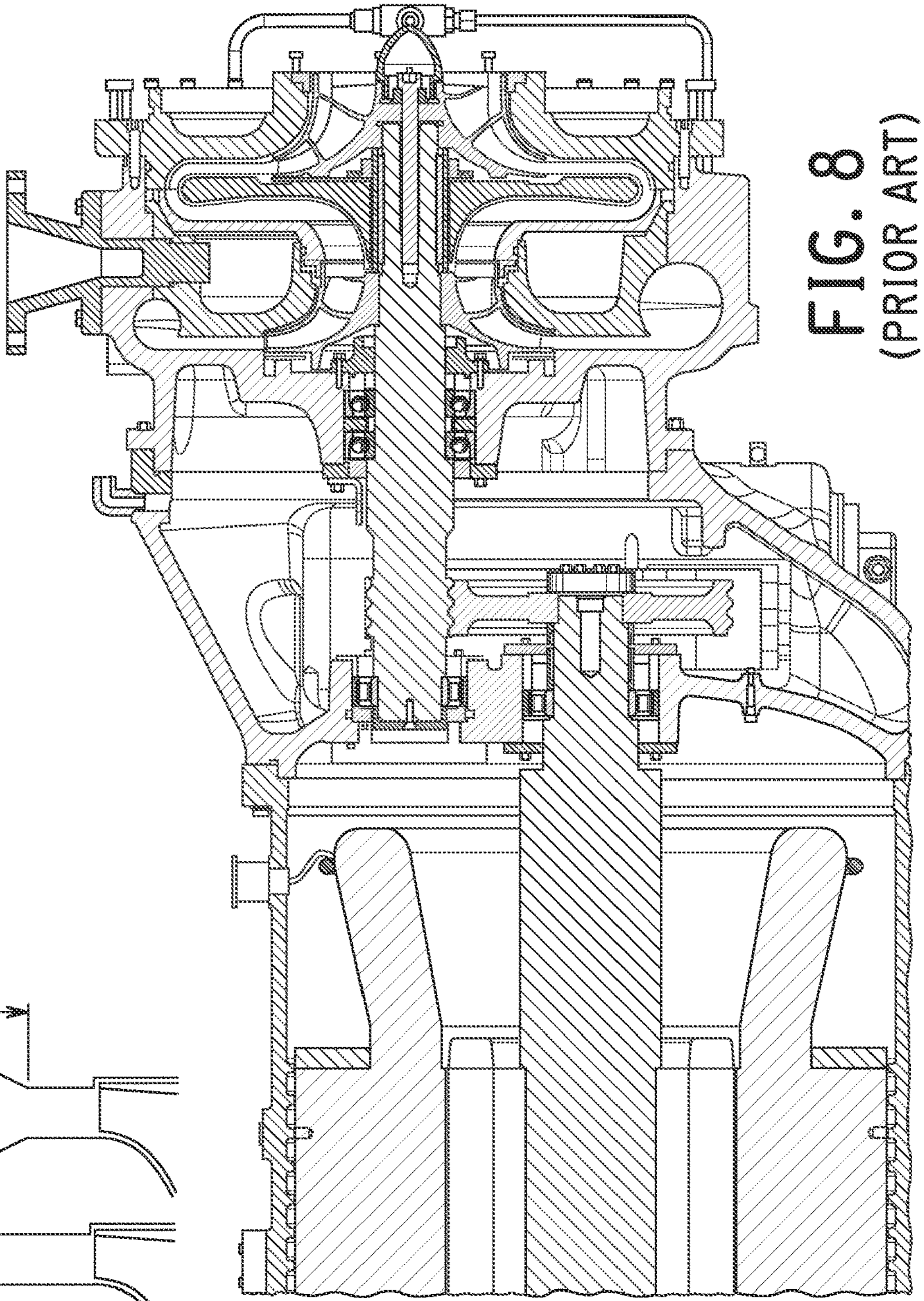
FIG. 8 (PRIOR ART)
FIG. 8 is a cross-sectional view of a conventional in-line multistage centrifugal compressor for a chiller.
Figure 7:
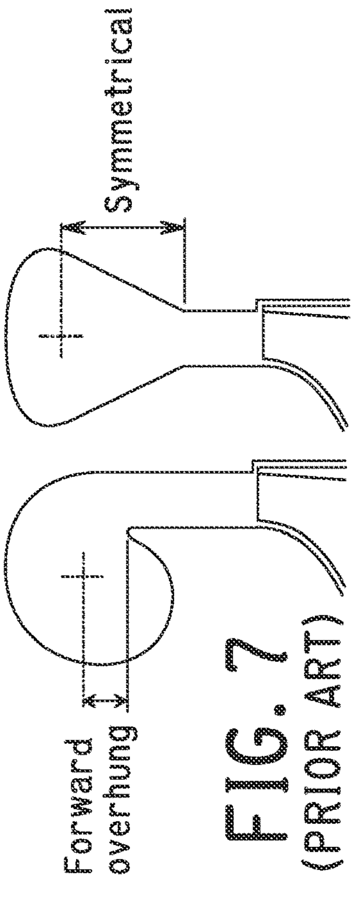
FIG. 7 (PRIOR ART)
FIG. 7 illustrates a forward overhung volute configuration and a symmetrical volute configuration.

In some embodiments, the volute forming member 56 and the insert 58 may be configured and arranged such that the internal space 36*a* of the second stage volute 36 does not overlap the insert 58 when viewed along a direction perpendicular to the axial direction (rotational axes A1 and A2). In other words, the entire interior space 36*a* of the second stage volute 36 is defined by the volute forming member 56 and only the second stage diffuser 34 is defined by opposing surfaces of the volute forming member 56 and the insert 58 (i.e., the inner surface 56*a* and the diffuser defining wall surface 58*a*). Also, in some embodiments, the second stage volute 36 has an asymmetrical cross-sectional shape in a cross section lying in a plane that includes a rotational center axis of the second stage impeller (i.e., the rotational axes A1 and A2). That is, unlike conventional centrifugal compressors for use in a chiller system, which may have a symmetrical or a forward overhung configuration (see FIGS. 7 and 8), the second stage volute 36 according to this disclosure has a reverse overhung configuration (i.e., a shape that is biased toward the compressor motor 42) and may have a non-circular or other asymmetrical shape in the cross-sectional view.

In some embodiments, a ratio of a radius of the first stage impeller 26 to a distance between the first stage impeller 26 and the second stage impeller 28 is equal to or larger than 0.5 and smaller than or equal to 1.0. More preferably, the ratio is equal to or larger than 0.65 and smaller than or equal to 8.5. The distance is measured, for example, between back sides (i.e., inlet sides) of the impellers 26 and 28. It has been found ratios in these ranges can be achieved with a centrifugal compressor having a reverse overhung second stage volute in accordance with this disclosure. Smaller values of the ratio indicate a more compact structure with the impellers 26 and 28 being closer together. In some embodiments, the radii (diameters) of the first stage impeller 26 and the second stage impeller 28 are substantially the same, but the centrifugal compressor 12 is not limited to a configuration in which the radii of the impellers are the same.

There is a general trend to transition to so-called "low global warming potential (low GWP)" refrigerants in chiller systems and other HVAC applications to reduce the impact on the environment caused by the release of refrigerants into the atmosphere. GWP is a measure of a greenhouse gas when it is released into the atmosphere and benchmarked against $CO_2$, which is defined to have a GWP equal to one. Thus, GWP is a measure of the potential for a refrigerant or other gas to behave as a greenhouse gas, which can contribute to global warming. The lower the GWP rating (or "GWP value", the lower the potential of the refrigerant to behave as a greenhouse gas when released into the atmosphere. Examples of low-GWP refrigerants for HVAC applications include R1233zd, R1234ze and R1234yf. Each of R1233zd, R1234ze and R1234yf has a global warming potential (GWP)<10. In this application, "low-GWP refrigerant" shall be defined as a refrigerant having a GWP value smaller than 10.

In some embodiments, the centrifugal compressor 12 may be particularly configured to be used with a low GWP refrigerant. Low GWP refrigerants are being used more and more frequently in chiller systems. However, the centrifugal compressor 12 is not limited a configuration optimized for use with a low GWP refrigerant.

The reverse overhung configuration of the second stage volute 36 enables the distance between the first stage impeller 26 and the second stage impeller 28 to be reduced because the second stage volute 36 is biased toward the compressor motor 42 and away from the compressor housing 46 and the second stage impeller 28. Consequently, some of the space conventionally occupied by the second stage volute 36 can be utilized to move the first stage impeller 26 and the second stage impeller 28 closer together without sacrificing space needed for other features, such as the injection nozzle 52. Moreover, the compact arrangement of the impellers achieved due to the reverse overhung configuration of the second stage volute facilitates a configuration in which the impellers are driving directly by the output shaft 48 of the compressor motor 42 without using a gear mechanism and a secondary shaft (e.g., compare FIG. 3 and FIG. 8). Put another way, eliminating the gear mechanism and sizing the motor housing appropriately frees up space on the motor side (discharge side) of the centrifugal compressor 12 and enables the reverse overhung configuration of the second stage volute 36 to be utilized. This, in turn, enables the distance between the first and second stage impellers to be shortened, the length of the portion of the shaft that supports the first and second stage impellers to be shortened, and the overall axial length of the centrifugal compressor 12 to be shortened.

Although the centrifugal compressor 12 of the illustrated embodiment is a two-stage centrifugal compressor, similar advantages can be obtained in a centrifugal compressor having any number of impellers. So long as the centrifugal compressor has a compressor housing enclosing at least one impeller and a volute having a reverse overhung configuration on a discharge side of the compressor housing, the reverse overhung configuration can contribute to shortening the axial length of the centrifugal compressor.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

Additionally, the term "low global warming potential (GWP) refrigerant" used herein refers to any refrigerant or blend of refrigerants that is suitable for use in the refrigeration circuit of a chiller system and has a low potential for contributing to global warming as benchmarked against $CO_2$ gas. The refrigerants R1233zd, R1234ze, and R1234fy are cited in this application as examples of low-GWP refrigerants. However, a person of ordinary skill in the refrigeration field will recognize that the present invention is not limited to these refrigerants.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A centrifugal compressor for a chiller comprising:
- an inlet guide vane;
- an impeller;
- a motor arranged to drive the impeller, the motor including a motor housing;
- a diffuser;
- a volute forming member disposed downstream of the diffuser and forming a volute to receive a refrigerant after the refrigerant has been compressed, the volute having a reverse overhung configuration;
- a compressor housing enclosing the impeller; and
- an insert disposed around an outer periphery of the impeller and interposed between the volute forming member and the compressor housing,
- the insert including a diffuser defining wall surface that opposes an inner surface of the volute forming member,
- the diffuser being defined between the volute forming member and the diffuser defining wall surface,
- the motor housing being disposed on a discharge side of the compressor housing, and
- at least a portion of the volute overlapping the motor housing when viewed along a direction perpendicular to an axial direction of the centrifugal compressor.

2. The centrifugal compressor according to claim 1, wherein
- along an axial direction of the centrifugal compressor, the diffuser is disposed between the impeller and an axial-direction center of the volute.

3. The centrifugal compressor according to claim 1, wherein
- the motor is disposed exterior to the compressor housing such that the impeller is positioned between the motor and the diffuser along an axial direction of the centrifugal compressor.

4. The centrifugal compressor according to claim 1, wherein
- the motor is disposed exterior to the compressor housing such that the diffuser is positioned between the motor and the impeller along an axial direction of the centrifugal compressor.

5. The centrifugal compressor according to claim 1, wherein
- the volute forming member is interposed between the motor housing and the discharge side of the compressor housing.

6. The centrifugal compressor as in claim 1, wherein
- the volute forming member is affixed to an exterior of the compressor housing.

7. The centrifugal compressor according to claim 1, wherein
- the centrifugal compressor is configured to be used with low-pressure refrigerants.

8. The centrifugal compressor according to claim 1, wherein
- the centrifugal compressor is configured to be used with low GWP refrigerants.

* * * * *